(12) United States Patent
Bowen et al.

(10) Patent No.: US 10,718,501 B2
(45) Date of Patent: *Jul. 21, 2020

(54) JUNCTION BOX-DRIVER ASSEMBLY FOR DIRECT MOUNT LUMINAIRES

(71) Applicant: SIGNIFY HOLDING B.V., Eindhoven (NL)

(72) Inventors: John E. Bowen, Sharpsburg, GA (US); Jared Michael Davis, Newnan, GA (US)

(73) Assignee: Signify Holding B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,892

(22) Filed: Dec. 9, 2019

(65) Prior Publication Data

US 2020/0109843 A1    Apr. 9, 2020

Related U.S. Application Data

(63) Continuation of application No. 16/290,414, filed on Mar. 1, 2019, now Pat. No. 10,502,404, which is a (Continued)

(51) Int. Cl.
*F21V 23/00* (2015.01)
*H02G 3/20* (2006.01)
(Continued)

(52) U.S. Cl.
CPC ............ *F21V 23/008* (2013.01); *F21S 8/026* (2013.01); *F21V 21/041* (2013.01); (Continued)

(58) Field of Classification Search
CPC ...... F21V 23/008; F21V 23/001; F21V 23/04; F21V 23/06; F21V 21/041; F21S 8/026; F21Y 2115/10; H02G 3/20
See application file for complete search history.

(56) References Cited

U.S. PATENT DOCUMENTS 8,177,390 B2    5/2012 Miskin
9,247,597 B2    1/2016 Miskin
(Continued)

OTHER PUBLICATIONS

"Diode LED Launches First UL Listed Driver and Junction Box Combination". Mar. 16, 2017. pp. 1-3. https://www.elementalled.com/press-releases/diode-led-launches-first-ul-listed-driver-and-junction-box-combination/.

(Continued)

*Primary Examiner* — Jimmy T Vu

(74) *Attorney, Agent, or Firm* — King & Spalding LLP

(57) ABSTRACT

A junction box-driver assembly includes a housing that is configured to route electrical wiring to a luminaire therethrough and house a driver module therein. The housing includes a back plate that defines a junction box cavity and a driver cavity that is disposed adjacent to and in fluid communication with the junction box cavity. Further, the housing includes a junction box cover that is coupled to the back plate and configured to cover the junction box cavity that is configured to route the electrical wiring therethrough and/or enclose wire connections therein. Furthermore, the housing includes a driver cavity cover that is removably coupled to the back plate to cover the driver cavity that is configured to house the driver module therein. The junction-box driver assembly further includes a mounting strut that is removably coupled to the housing and configured to releasably lock the junction box-driver assembly to a mounting frame.

20 Claims, 14 Drawing Sheets

Related U.S. Application Data continuation-in-part of application No. 16/014,394, filed on Jun. 21, 2018, now Pat. No. 10,299,336.

(51) Int. Cl.
    *F21V 21/04*     (2006.01)
    *F21V 23/06*     (2006.01)
    *F21S 8/02*     (2006.01)
    *F21V 23/04*     (2006.01)
    *F21Y 115/10*     (2016.01)

(52) U.S. Cl.
    CPC ............ *F21V 23/001* (2013.01); *F21V 23/04* (2013.01); *F21V 23/06* (2013.01); *H02G 3/20* (2013.01); *F21Y 2115/10* (2016.08)

(56) References Cited

U.S. PATENT DOCUMENTS

| | | |
|---|---|---|
| 10,116,127 B1 | 10/2018 | Lopez-Martinez et al. |
| 10,502,404 B1 * | 12/2019 | Bowen .................... H02G 3/20 |
| 2009/0258524 A1 * | 10/2009 | McEnery .................. F21S 8/02 439/334 |
| 2014/0301073 A1 | 10/2014 | Miskin |
| 2014/0301074 A1 | 10/2014 | Miskin |

OTHER PUBLICATIONS

Junction Box: Hard-Wire LED Driver. Jesco Lighting Group. www.jescolighting.com Oct. 25, 2011.

\* cited by examiner

JUNCTION BOX-DRIVER ASSEMBLY FOR DIRECT MOUNT LUMINAIRES

CROSS-REFERENCE TO RELATED APPLICATIONS

This application is a continuation application of and claims priority to U.S. patent application Ser. No. 16/290,414 filed on Mar. 1, 2019 and titled "Junction Box-Driver Assembly For Direct Mount Luminaires," which is a continuation-in-part of and claims priority to U.S. patent application Ser. No. 16/014,394 filed in the name of John Bowen and Raymond Janik on Jun. 21, 2018 and titled "Configurable Lighting System," and which issued as U.S. Pat. No. 10,299,336 on May 21, 2019. The entire contents of the foregoing applications are hereby incorporated herein by reference.

TECHNICAL FIELD

Embodiments of the present disclosure relate generally to luminaires, and more particularly to a junction box-driver assembly for direct mount luminaires.

BACKGROUND

Direct mount luminaires (herein 'luminaires') are recessed lighting units that are installed in mounting surfaces such as drywall ceilings or suspended ceilings without a recessed housing. The luminaires usually require electrical conductors to supply electrical power to the light sources of the luminaires. To be code compliant, i.e., to meet the National Electric Code (NEC) or other codes for safe installation of electrical wiring and equipment, the electrical conductors or any other electrical wiring to the luminaire are required to be routed through a junction-box that is assigned to the luminaire.

Conventional junction boxes are not configured to be installed in the ceiling or attached to a mounting frame that is disposed in the ceiling after the ceiling has been finished. So, typically, in new construction, conventional junction boxes must be installed, e.g., attached to the joists in the ceiling or to a mounting frame that is disposed in the ceiling prior to finishing the ceiling.

Further, conventional junction boxes are not configured to house electrical power supply components therein, such as a driver associated with a luminaire. Instead, in conventional luminaires, the driver associated with the luminaire may be disposed in or attached to a light module of the luminaire that comprises the light source. Said arrangement of a driver within the light module provides very little or poor thermal separation of the driver from the heat generated by the light source of the light module, which in turn may affect the longevity of the driver. Further, said arrangement does not allow the light module and the driver to be removed and replaced separately and easily because the light module and the driver may be attached as a single unit which may be inconvenient and undesirable.

The driver may be taken out of the light module and moved to the mounting frame (e.g., plaster frame) to provide flexibility and good thermal separation of the driver from the light source of the light module. However, said movement of the driver to the mounting frame may not be practicable because the mounting frame may not be configured to accommodate the separate footprints of both the junction box and driver. Expanding the mounting frame to accommodate both the junction box and driver separately will increase the manufacturing cost, which will eventually translate to higher product cost to the consumer.

Additionally, in conventional systems, the junction boxes are attached to the mounting frames using fasteners which require the installer to use tools, such as screw drivers or other appropriate fastening tools. Said conventional systems do not allow quick installation, removal, and replacement of the junction boxes.

This background information is provided to reveal information believed to be of possible relevance to the present disclosure. No admission is necessarily intended, nor should be construed, that any of the preceding information constitutes prior art against the present disclosure.

SUMMARY

In one aspect, the present disclosure relates to a junction box-driver assembly. The junction box-driver assembly include a housing that defines a cavity that is configured to route electrical wiring to a luminaire therethrough and house a driver module therein. The cavity comprises a junction box cavity and a driver cavity that is disposed adjacent to and in fluid communication with the junction box cavity. The junction box cavity is configured to at least one of route the electrical wiring to the luminaire and enclose electrical wiring connections therein. The driver cavity is configured to house the driver module therein. The housing includes a back plate, a junction box cover that is removably coupled to the back plate and configured to cover the junction box cavity, and a driver cavity cover that is removably coupled to the back plate and configured to cover the driver cavity. Further, the junction-box driver assembly includes a mounting strut that is coupled to the housing and configured to releasably lock the junction box-driver assembly to a mounting frame.

In another aspect, the present disclosure relates to a junction box-driver assembly that includes a housing that is configured to route electrical wiring to a luminaire and house a driver module therein. The housing includes a back plate that defines a cavity. The cavity comprises a junction box cavity and a driver cavity that is disposed adjacent to and in fluid communication with the junction box cavity. Further, the junction box-driver assembly includes a junction box cover that is coupled to the back plate and configured to cover the junction box cavity that is configured to at least one of route the electrical wiring to the luminaire and provide a protective space for enclosing wiring connections associated with the electrical wiring to the luminaire. Furthermore, the junction box-driver assembly includes a driver cavity cover that is removably coupled to the back plate and configured to cover the driver cavity that is configured to house the driver module therein.

In yet another aspect, the present disclosure relates to a junction box-driver assembly. The junction box-driver assembly includes a back plate that is configured to route electrical wiring to a luminaire and house an electrical power supply device associated with the luminaire therein. The back plate includes a base wall, and a side wall that extends along at least a portion of a perimeter of the base wall such that one end of the back plate is open. The side wall is substantially perpendicular to the base wall. The base wall and the side wall are arranged such that they define a junction box cavity and a driver cavity that is disposed adjacent to and in fluid communication with the junction box cavity. Further, the junction box-driver assembly includes a junction box cover that is coupled to the back plate and configured to cover the junction box cavity that is configured to route the electrical wiring to the luminaire and provide a protective space for enclosing wiring connections associated with the electrical wiring. Furthermore, the junction box-driver assembly includes a driver cavity cover that is removably coupled to the back plate and configured to cover the driver cavity. Additionally, the junction box-driver assembly includes the electrical power supply device disposed in the driver cavity and comprising a switch interface that extends through a switch opening in the driver cavity cover. The switch interface is configured to allow one or more controllable features of a light module of the luminaire to be field selectable when the light module is coupled to the junction box-driver assembly. The junction box-driver assembly includes a wire trap connector coupled to the side wall of the back plate and configured to receive and retain the electrical wiring into the junction box cavity without using tools. The junction box-driver assembly also includes a mounting strut that is removably coupled to the back plate and configured to releasably lock the junction box-driver assembly to a mounting frame.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
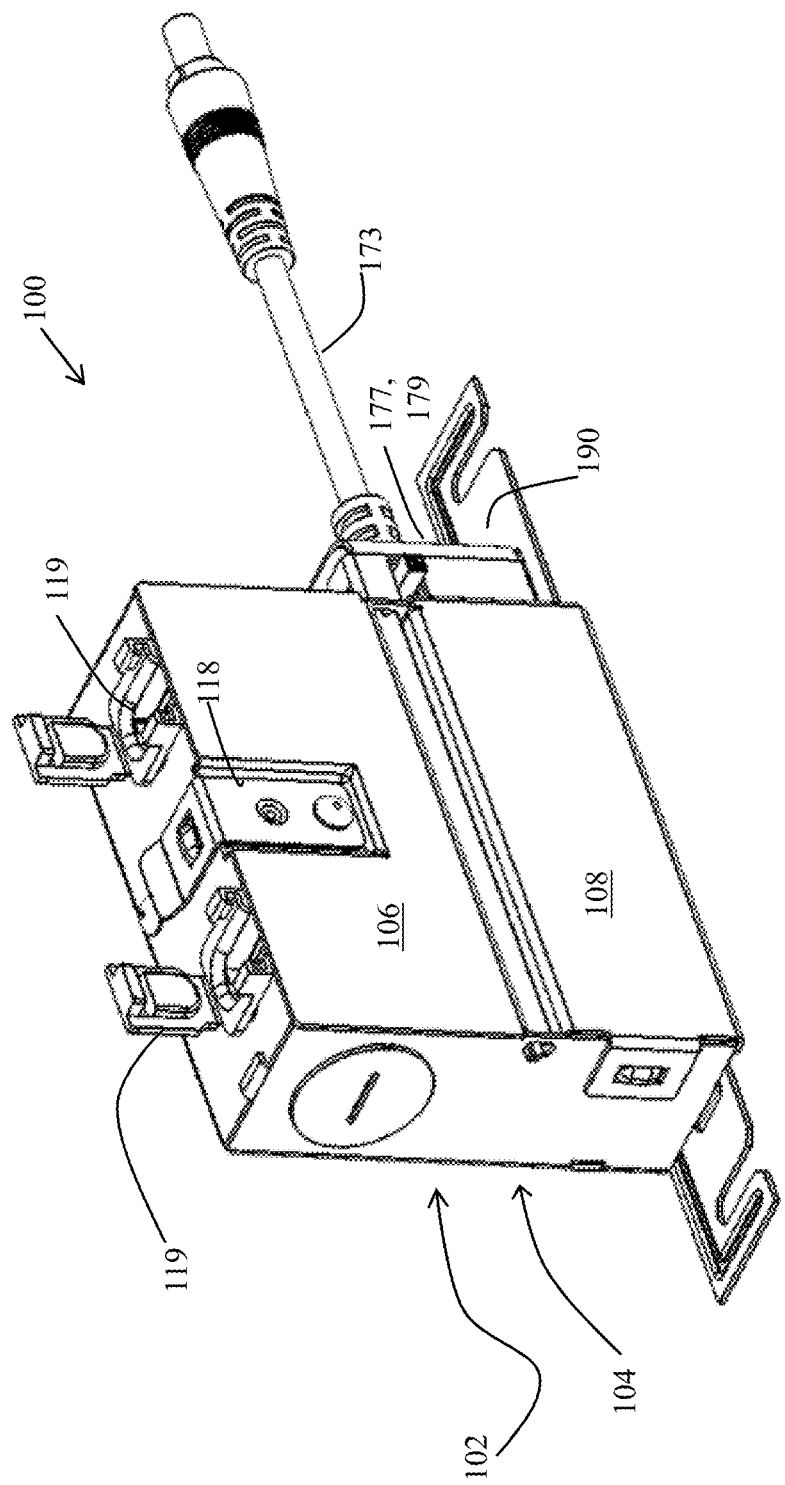
FIGS. 1-3 illustrate a front, rear, and bottom perspective view of an example junction box-driver assembly, in accordance with example embodiments of the present disclosure.
Figure 2:
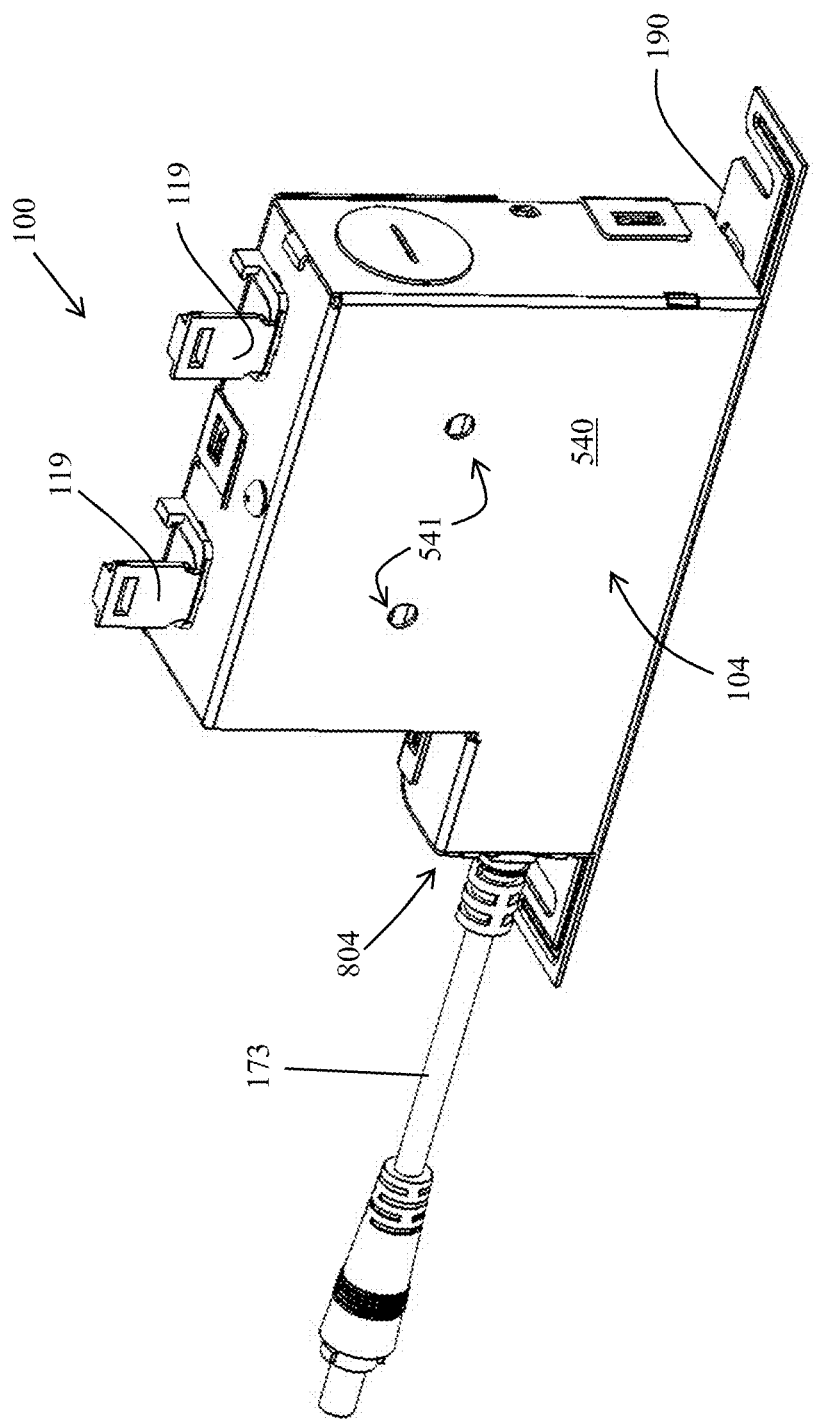

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

In the following paragraphs, a junction box-driver assembly for direct mount luminaires will be described in further detail by way of examples with reference to the attached drawings. In the description, well-known components, methods, and/or processing techniques are omitted or are briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

Even though the present disclosure describes the junction box-driver assembly as being configured for use with direct mount luminaires, one of skill in the art can understand and appreciate that the configurable mounting frame can be used with any other appropriate luminaire, e.g., recessed luminaires mounted in recessed housings, without departing from a broader scope of the present disclosure.

In one example, the junction box-driver assembly of the present disclosure includes a housing that defines a continuous cavity. A first portion of the continuous cavity defined by the housing of the junction box-driver assembly is configured as a driver cavity to house a driver module or an electrical circuit that is used to power a luminaire. A second portion of the continuous cavity is configured as a junction box cavity that provides a protective volume to enclose wire connections therein and/or route electrical wiring to the luminaire therethrough. In certain example embodiments, the cavity may not be continuous and may instead be divided into subcompartments. In some examples, the driver module may include switches that allow a user to select and change various controllable features of the luminaire, such as a color temperature of the light source in the luminaire, lumen output, and/or a radio communication protocol associated with the luminaire. The housing of the junction box-driver assembly also includes knockouts and wire traps that are configured to receive and route electrical conductors therethrough and into the junction box cavity via rigid conduits or flexible cables, respectively. Further, the junction box-driver assembly includes a mounting strut that is removably coupled to the housing. The mounting strut allows the junction box-driver assembly to be releasably locked and/or coupled to a mounting frame, also known as a plaster frame, without the use of any tools.

The junction box-driver assembly of the present disclose in which the junction box and the driver module are configured in a stacked arrangement within a single housing may reduce the footprint that is needed to mount both the junction box and the driver module on a mounting frame. Further, the junction box-driver assembly of the present disclosure allows the driver module to be remotely located and removably coupled to a light module of the luminaire, thereby providing thermal separation and modularity, e.g., allowing the same driver module to drive different light modules. Furthermore, the mounting strut of the junction box-driver assembly provides the ability to toollessly and removably couple the junction box-driver assembly to a mounting frame, which in turn allows a user to easily and quickly install, remove, and replace the junction box-driver assembly as needed in new construction applications or remodel applications where the mounting frame is already mounted in the finished ceiling (i.e., mounting after ceiling in finished).

Figure 9:
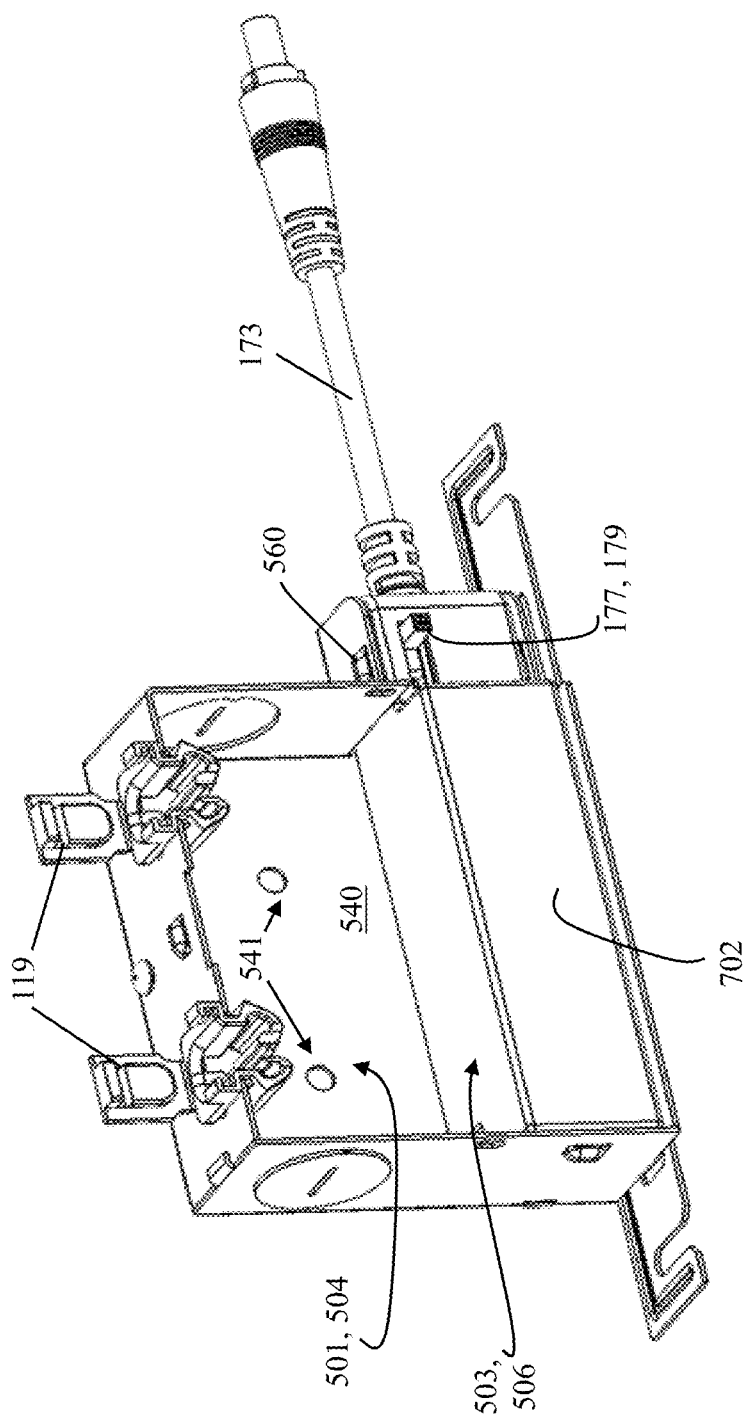
FIG. 9 illustrates the front perspective view of the example junction box-driver assembly of FIG. 1 with the driver cavity cover removed therefrom to expose the driver module disposed in the driver cavity, in accordance with example embodiments of the present disclosure.
Figure 10:
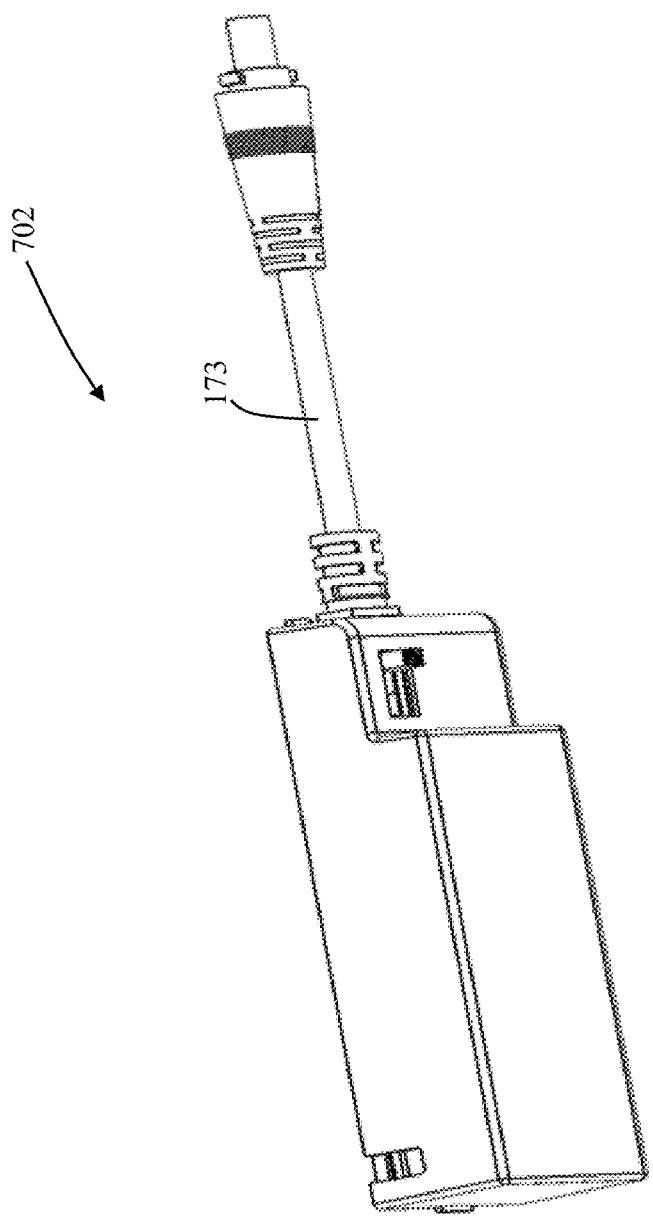
FIG. 10 illustrates the driver module of the example junction box-driver assembly of FIG. 1, in accordance with example embodiments of the present disclosure.
Figure 11:
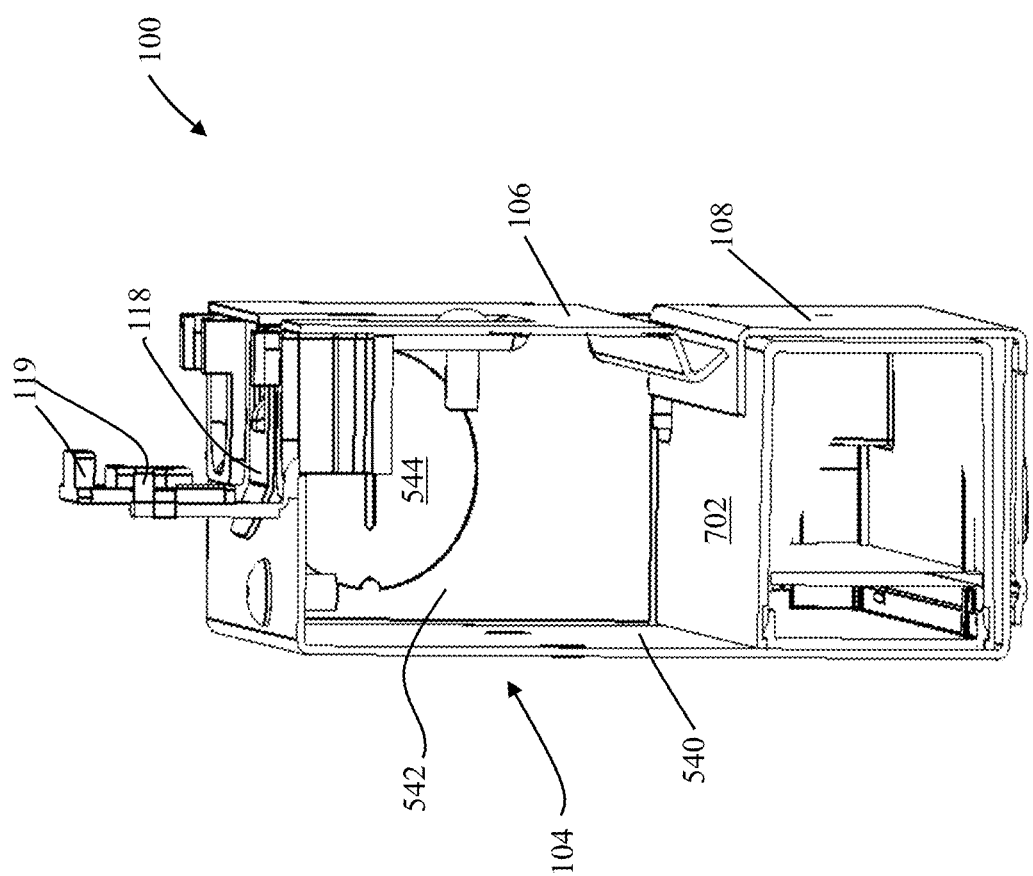
FIG. 11 illustrates a cross-section view of the example junction box-driver assembly of FIG. 1, in accordance with example embodiments of the present disclosure.

Moving now to discuss the figures, FIGS. 1-14 will describe one or more example embodiments of a junction-box driver assembly. Referring to FIGS. 1-14, an example junction-box driver assembly 100 may include a housing 102 that defines a continuous cavity 502 (shown in FIG. 5 and FIG. 11) that is configured to route electrical wiring to a luminaire therethrough and house a driver module 702 (shown in FIG. 9) associated with the luminaire therein. In other words, the housing 102 may be configured as a junction box with additional space to house a driver module 702 within the junction box. In particular, a first portion 501 of the continuous cavity 502 may define a junction box cavity 504, and a second portion 503 of the continuous cavity 502 that is in fluid communication with the first portion 501 may define a driver cavity 506.

Figure 12:
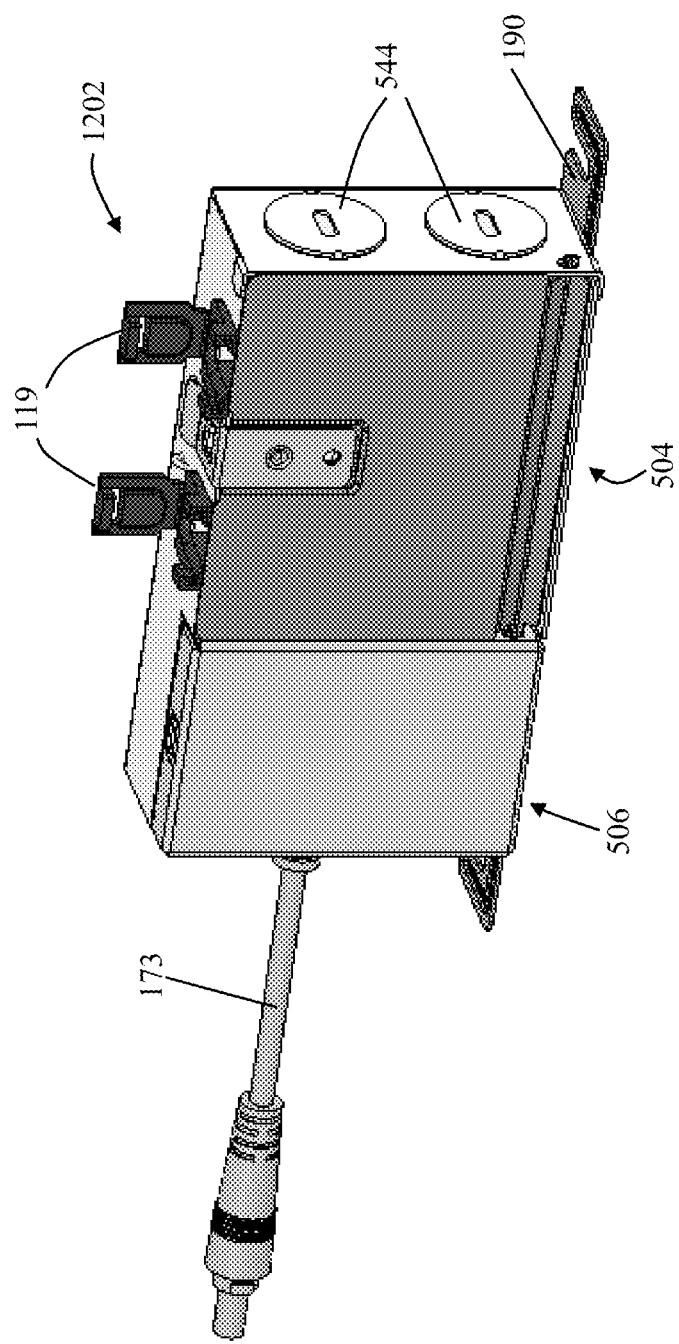
FIG. 12 illustrates another example junction box-driver assembly, in accordance with example embodiments of the present disclosure.

In one example, as illustrated in FIG. 1, the junction box cavity 504 defined by first portion 501 of the continuous cavity 502 and the driver cavity 506 defined by the second portion 503 of the continuous cavity 502 may be stacked one above the other. Said stacked arrangement where the junction box cavity 504 is stacked above the driver cavity 506 allows the electrical wiring connections and the driver module 702 to be accommodated within a single footprint, e.g., footprint of the driver module 702, without occupying additional space on the mounting frame 1302 (e.g., plaster frame (shown in FIG. 13)). However, in another example, as illustrated in FIG. 12, the junction box cavity and the driver cavity may be arranged next to each, i.e., side by side. Said arrangement where the junction box cavity 504 and the driver cavity 506 are arranged next to each other may be suitable for installations in ceiling that have smaller openings, i.e., to fit smaller diameter ceiling (and/or plaster frame) openings. In yet another example, the junction box cavity and the driver cavity may be arranged such that the resulting junction box may be suitable for installation in shallow plenums, i.e., low profile installations.

Even though the figures of the present disclosure illustrate the junction box cavity 504 and the driver cavity 506 as being stacked one on top of the other (FIG. 1) or side-by-side (FIG. 12), one of skill in the art can understand and appreciate that in other example embodiments, the housing 102 may have any other appropriate shapes and the junction box cavity 504 and the driver cavity 506 may be configured in any appropriate arrangement without departing from a broader scope of the present disclosure. For example, in some examples, the driver cavity may be disposed above the junction box cavity or the driver cavity and the junction box cavity may be arranged back-to-back.

Figure 5:
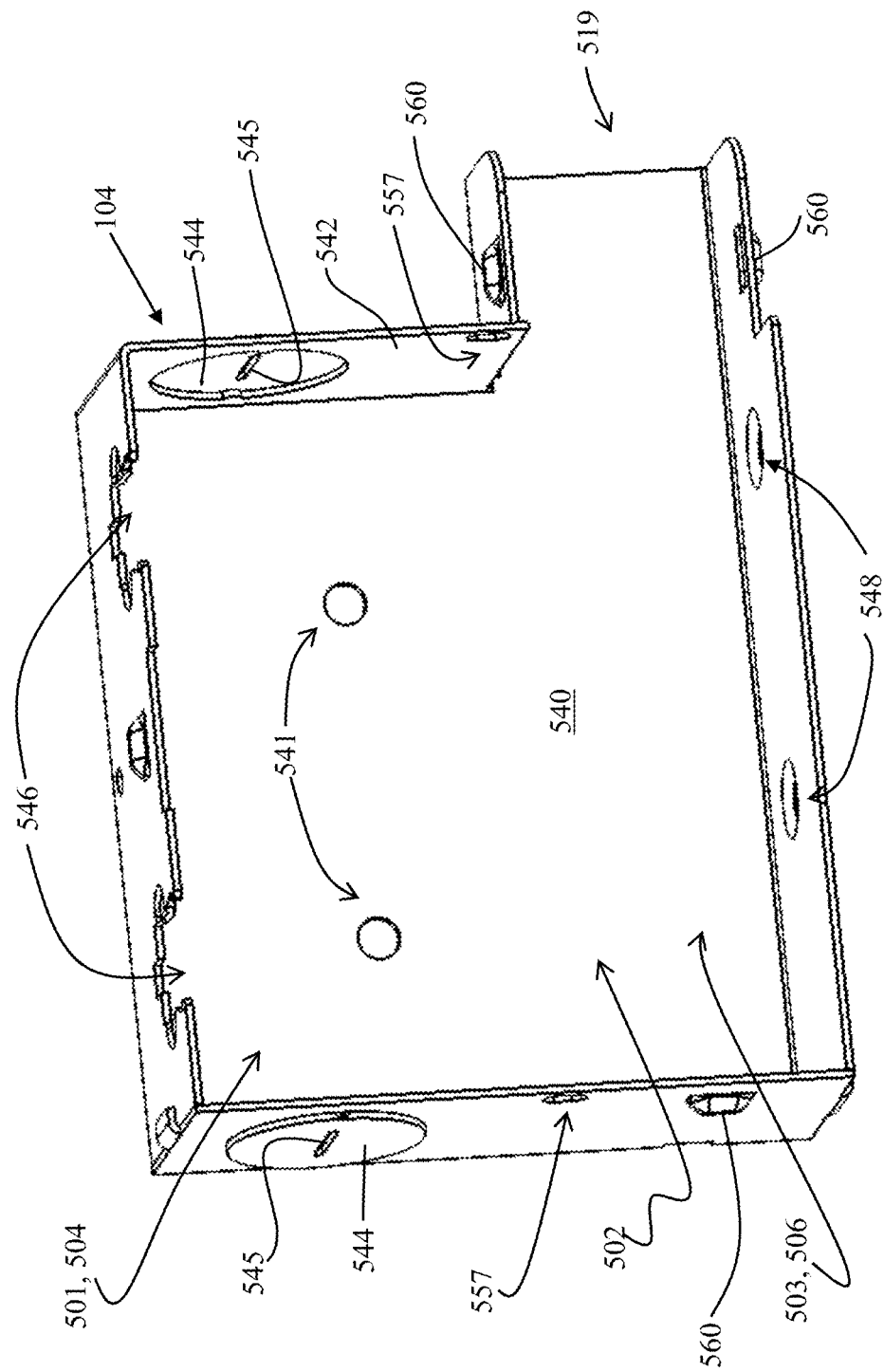
FIG. 5 illustrates a back plate of the example junction box-driver assembly of FIG. 1, in accordance with example embodiments of the present disclosure.
Figure 6:
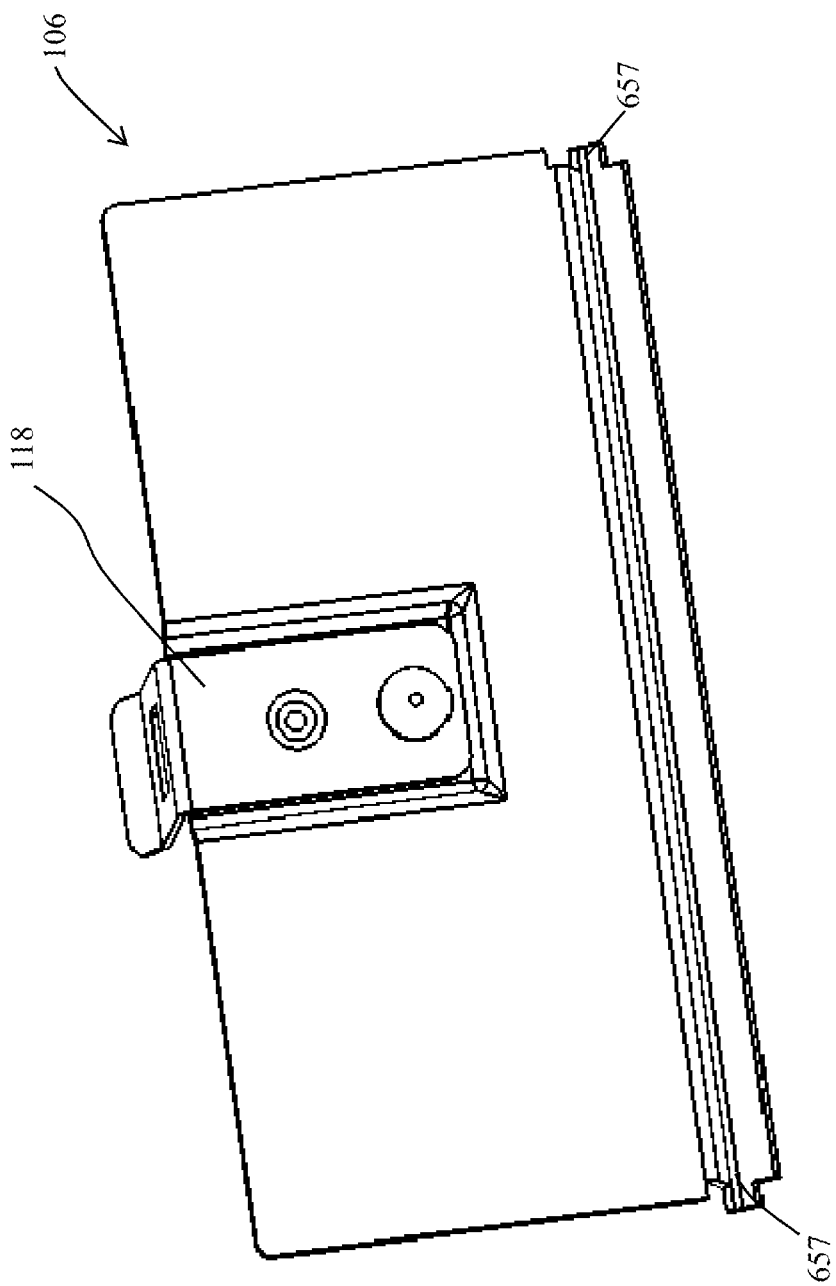
FIG. 6 illustrates a junction box cover of the example junction box-driver assembly of FIG. 1, in accordance with example embodiments of the present disclosure.
Figure 7:
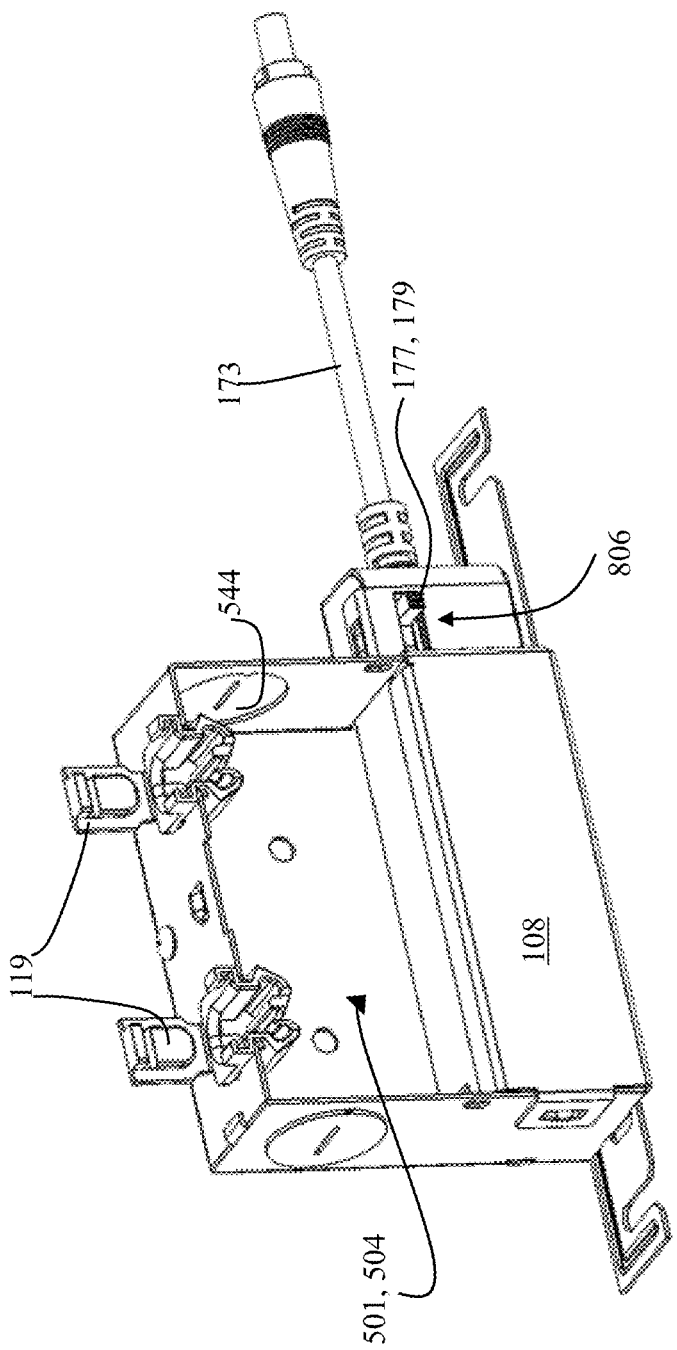
FIG. 7 illustrates the front perspective view of the example junction box-driver assembly of FIG. 1 with the junction box cover removed therefrom to expose the junction box cavity, in accordance with example embodiments of the present disclosure.
Figure 8:
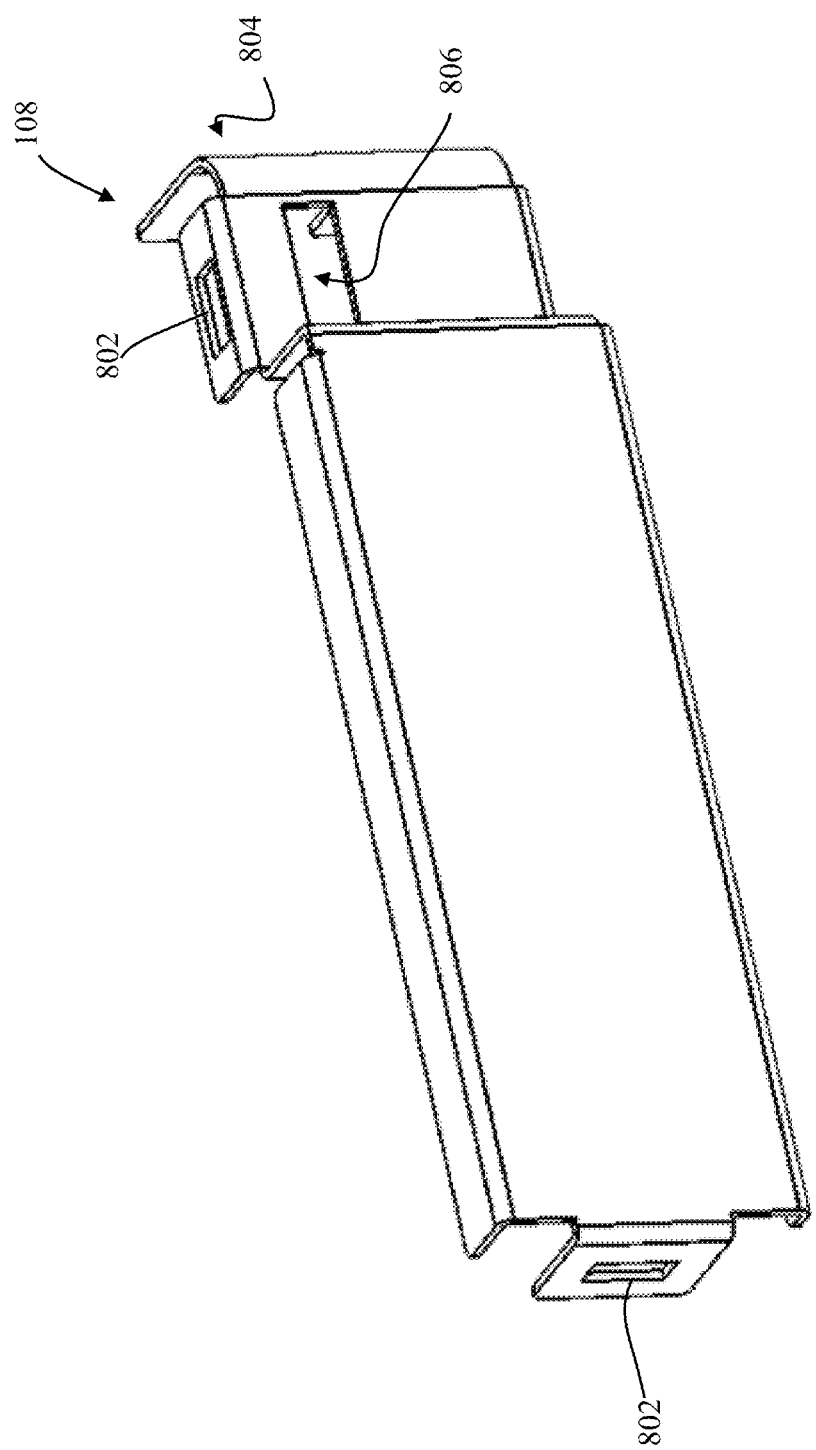
FIG. 8 illustrates a driver cavity cover of the example junction box-driver assembly of FIG. 1, in accordance with example embodiments of the present disclosure.

In either case, the housing 102 may include by a back plate 104 that defines the continuous cavity 502 that is open on one side 519 (shown in FIG. 5). Further, the housing 102 may include a junction box cover 106 that may be pivotally or hingedly coupled to the back plate 104 such that the junction box cover 106 covers the junction box cavity 504 of the junction box-driver assembly 100. Furthermore, the housing 102 may include a driver cavity cover 108 that is removably coupled to the back plate 104 to cover the driver cavity 506 of the junction box-driver assembly 100.

The back plate 104 may include pivot slots 557 that are configured to receive pivot flanges 657 of the junction box cover 106. In other example embodiments, the pivot slots 557 may be formed in any other portion of the back plate 104 such that the junction box cover 106 is pivotally coupled thereto and covers the junction box cavity 504 without departing from a broader scope of the present disclosure. Alternatively, the junction box cover 106 may be pivotally or removably arranged with respect to the back plate using any other appropriate mechanism without departing from a broader scope of the present disclosure. The junction box cover 106 may also include a latch member 118 that is removably coupled thereto. The latch member 118 may be configured to releasably latch the junction box cover 106 to the back plate 104 such that: (a) when the junction box cover 106 is latched to the back plate 104 using the latch member 118, the junction box cover 106 covers the junction box cavity 504; and (b) when the latch member 118 is released, the junction box cover 106 pivots about an axis that passes through the pivot slots 557 and opens to expose the junction box cavity 504.

Figure 13:
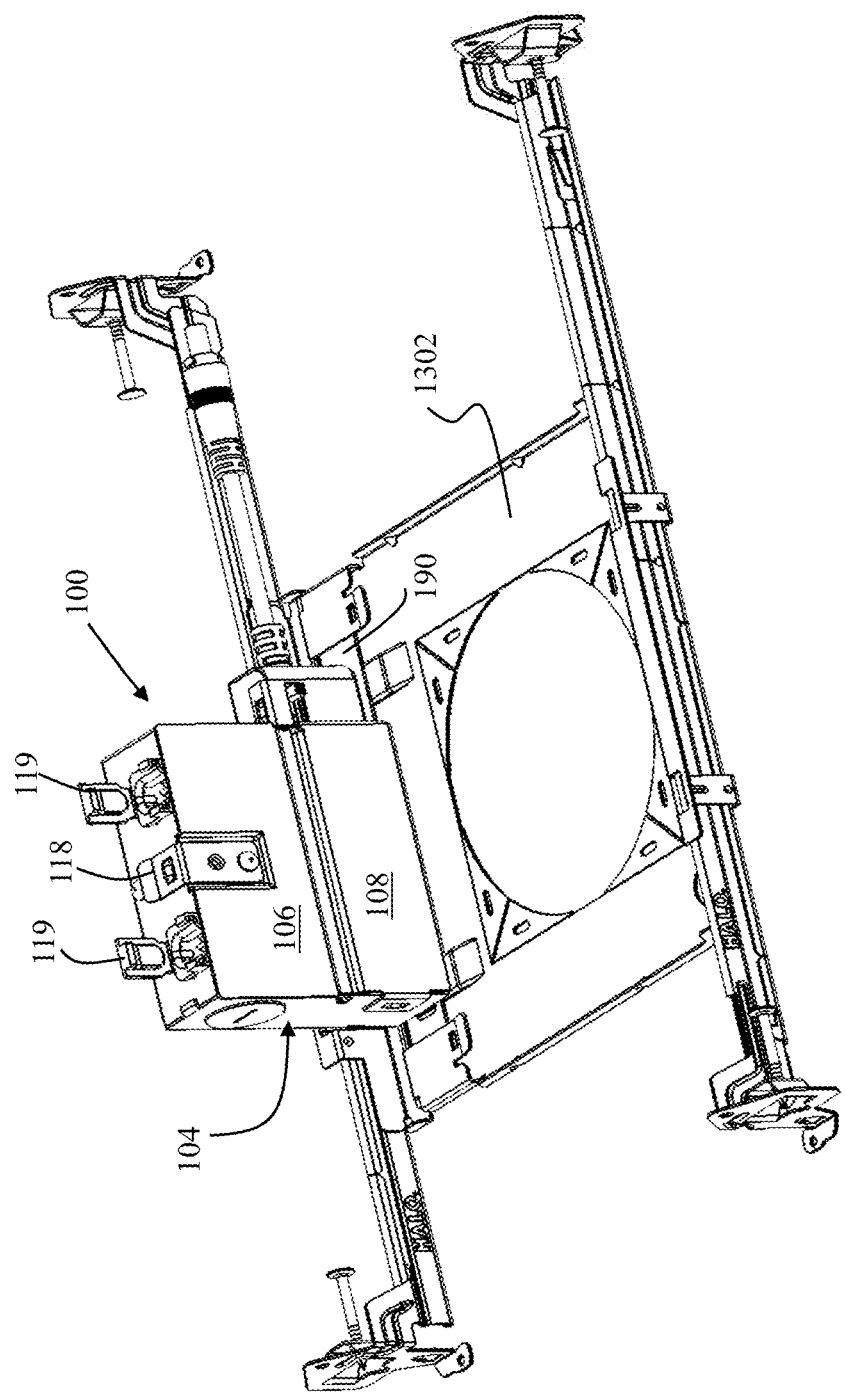
FIG. 13 illustrates a perspective view of the example junction box-driver assembly of FIG. 1 mounted on an example mounting frame, in accordance with example embodiments of the present disclosure.
Figure 14:
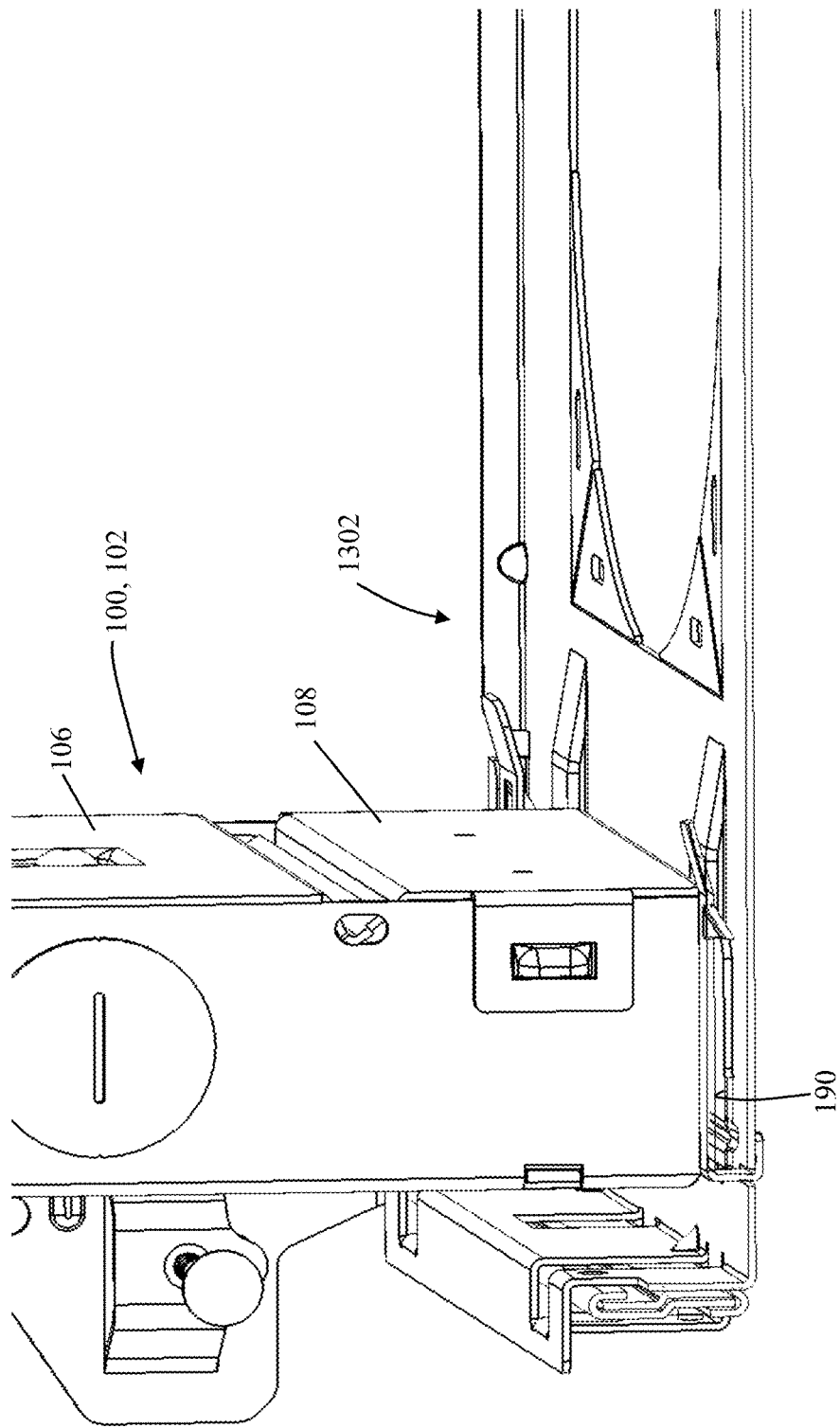
FIG. 14 illustrates a cross-sectional view of the example junction box-driver assembly mounted on the example mounting frame, in accordance with example embodiments of the present disclosure.

As illustrated in FIG. 5, the back plate 104 may include a base wall 540 that is substantially L-shaped. However, in other example embodiments, the base wall 540 may have any other appropriate shape without departing from a broader scope of the present disclosure (e.g., FIG. 12). In some examples, the base wall 540 and/or the back plate 104 as a whole may be detachable to provide access to the junction box cavity and the driver cavity. The base wall 540 may include mounting apertures 541 that are formed therein. The mounting apertures 541 may be configured to receive fasteners, such as nails, screws, etc., therethrough to directly mount the junction box-driver assembly 100 to structural beams, such as joists, in the ceiling. Alternatively, the junction box-driver assembly 100 may be releasably locked or removably mounted to a mounting frame 1302, such as a plaster frame, using a mounting strut 190 as illustrated in FIGS. 13-14. The mounting strut 190 and the releasable locking of the junction box-driver assembly 100 to the mounting frame using the mounting strut 190 will be described further below in association with FIGS. 13-14.

As illustrated in FIG. 5, the back plate 104 may further include a side wall 542 that extends along at least a portion of the perimeter of the base wall 540 such that one end 519 of the back plate 104 is open. The side wall 542 may be substantially perpendicular to the base wall 540. Further, the side wall 542 may include knockouts 544 with pry-out slots 545 that are formed therein and disposed adjacent the first portion 501 of the continuous cavity 502. The pry-out slots 545 may be configured to receive a tool therein, such as head of a screw driver, to remove the knockouts 544 from the side wall 542. The knockouts 544 may be removed to create openings in the side wall 542 and into the junction box cavity 504 of the housing 102. The openings that are formed in the side wall 542 by the removal of the knockouts 544 may be configured to receive rigid or flexible conduits or pipes and/or their fittings/connectors (not shown in the Figures) therein to route electrical conductors (wiring) from an external power source into the junction box cavity 504 of the junction-box driver assembly 100 via the conduits or pipes. Furthermore, the side wall 542 may include wire trap notches 546 that are configured to receive wire trap connectors 119 (shown in FIG. 1) therein. The wire trap notches 546 may be formed in the side wall 542 adjacent the first portion 501 of the continuous cavity 502. The wire trap connectors 119 disposed in the wire trap notches 546 may be configured to allow non-metallic sheathed cable (flexible cable) from an external power source to be installed or inserted into the junction box cavity 504 without tools and without removing the knockouts 544. The wire trap connectors 119 allow wiring connections to be made outside the junction box-driver assembly 100 and then insert or slide the cable directly into the wire trap connectors and the junction box cavity 504 after the wiring connections are made.

Additionally, the side wall 542 includes locking tabs 560 that protrude therefrom. The locking tabs 560 may be configured to engage with coupling slots 802 that are formed in the driver cavity cover 108 to removably couple the driver cavity cover 108 to the back plate 104 by a snap mechanism. The locking tabs 560 may be disposed on the side wall 542 adjacent the second portion 503 of the continuous cavity 502. In other example embodiments, the driver cavity cover 108 may be coupled to the back plate 104 using any other appropriate coupling mechanisms without departing from a broader scope of the present disclosure.

The driver cavity cover 108 may be configured to cover the driver cavity 506 of the junction box-driver assembly 100 and a driver module 702 that may be disposed in driver cavity 506. In addition to the coupling slots 802, the driver cavity cover 108 may include a connector cable routing notch 804 to route a connector cable 173 of the driver module 702 therethrough. For example, as illustrated in FIGS. 1-3, 7, 9, and 13, the connector cable 173 of the driver module 702 that is disposed in the driver cavity 506 of the housing 102 may extend out from the housing 102 of the junction box-driver assembly 100 through the connector cable routing notch 804. Further, the driver cavity cover 108 may include a switch opening 806 to receive the switch interface of a switch 177, e.g., a toggle 179, associated with the driver module 702 therethrough. The driver module 702 may be coupled to a light module that comprises one or more light source (e.g., light emitting diodes) via the connector cable 173. The switch 177 allows one or more controllable features of the light module to be field selectable as desired by a user. The one or more controllable features of the light module may include, but are not limited to, a color temperature, a high color rendering, a lumen output, a radio communication protocol, etc.

In some example embodiments, the driver module 702 may not include the switch 177 and accordingly, the driver cavity cover 108 may not include the switch opening 806. For example, as illustrated in FIG. 12, the driver module of the junction box-driver assembly 1202 may not include the switch 177 and thus, the driver module cover 108 may not include the switch opening 806. In some example embodiments, even though the junction box cavity 504 and the driver cavity 506 are arranged side-by-side, the footprint occupied by the junction box-driver assembly 1202 may be substantially similar to or lesser than the footprint occupied by the junction box-driver assembly 100 since the junction box-driver assembly 1202 has a smaller driver module (no switch feature).

Figure 3:
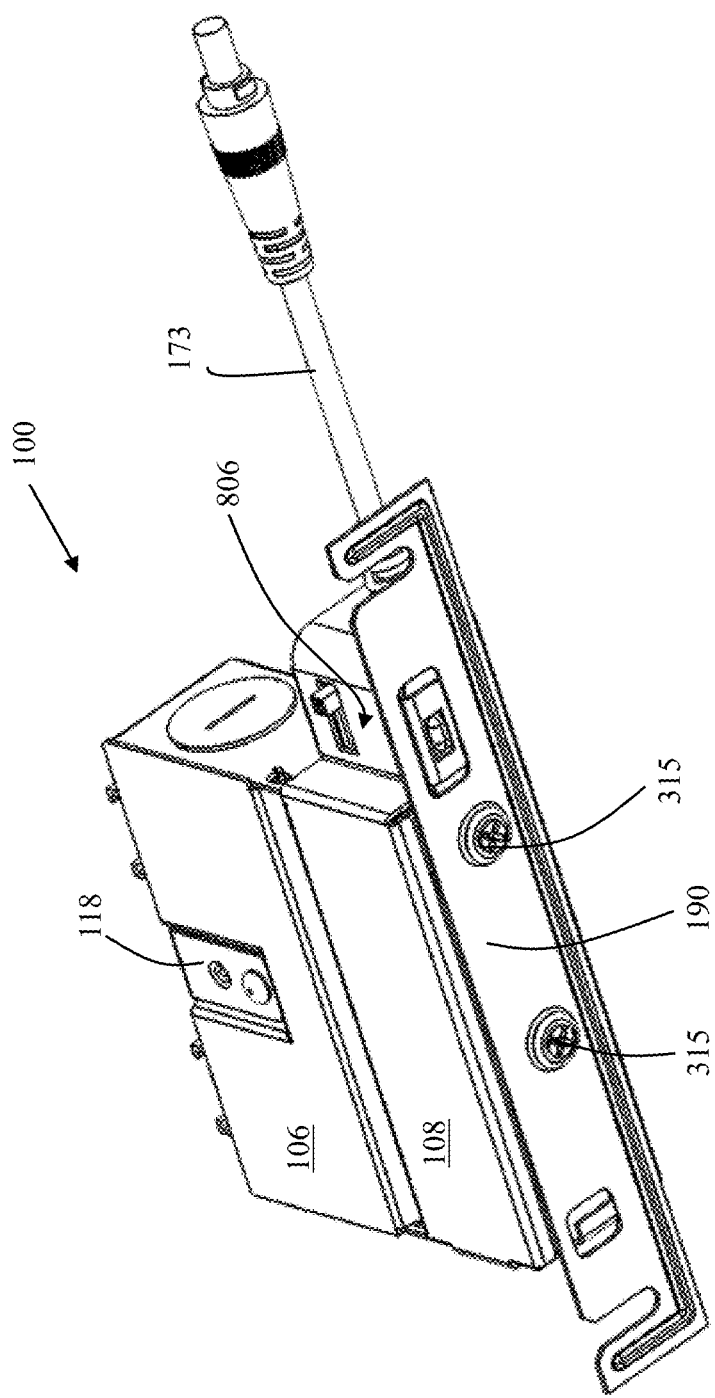

Furthermore, as illustrated in FIGS. 3 and 5, the side wall 542 of the back plate 104 may include mounting holes 548 that are configured to receive fasteners 315 therethrough to removably couple the mounting strut 190 to the junction box-driver assembly 100. As illustrated in FIGS. 13 and 14, the mounting strut 190 may be configured to releasably lock and/or removably couple the junction box-driver assembly 100 to a mounting frame 1302, such as a plaster frame, without the use of any tools. In other words, the mounting strut 190 allows toolless coupling and decoupling of the junction box-driver assembly 100 to be mounting frame 1302. The mounting frame 1302 may include complementary coupling features that are configured to receive and releasably lock the mounting strut 190 of the junction box-driver assembly 100 thereto. The mounting frame 1302, the complementary coupling features of the mounting frame 1302, and the releasable locking of the junction box-driver assembly 100 to the mounting frame 1302 using the mounting strut 190 are described in greater detail in a related U.S. patent application Ser. No. 16/290,437 filed Mar. 1, 2019 and titled "Configurable Mounting Frame for Direct Mount Luminaires," the entire contents of which is hereby incorporated herein by reference.

Figure 4:
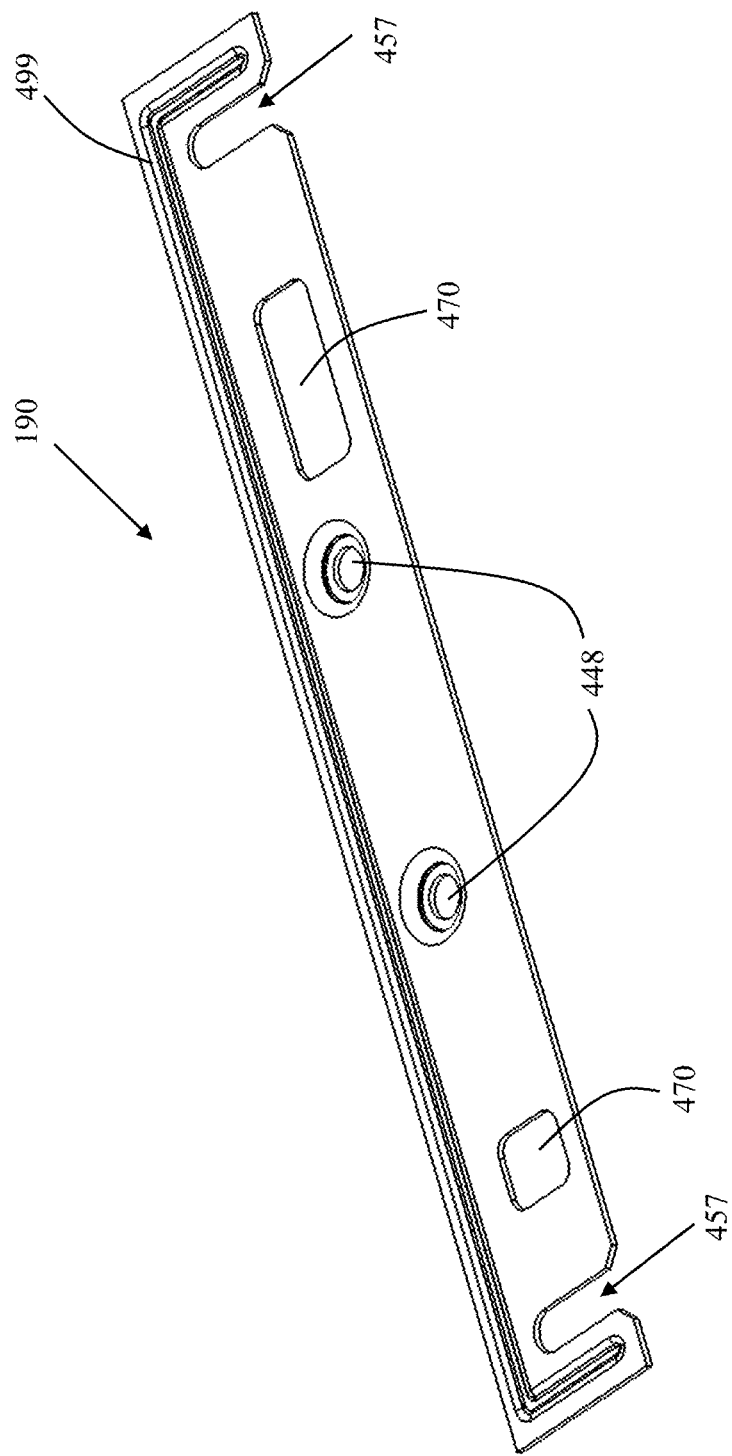
FIG. 4 illustrates an example mounting strut of the example junction box-driver assembly of FIG. 1, in accordance with example embodiments of the present disclosure.

As illustrated in FIG. 4, the mounting strut 190 may be an elongate member that includes clearance openings 470 that are configured to receive the locking tabs 560 of the back plate 104 therethrough, e.g., when the mounting strut 190 is coupled to the housing 102 of the junction box-driver assembly 100. Further, the mounting strut 190 may include mounting openings 448 that are configured to receive fasteners therethrough to couple the mounting strut 190 to the housing 102 of the junction box-driver assembly 100. In particular, the housing 102 of the junction box-driver assembly 100 may be disposed on the mounting strut 190 such that the mounting holes 548 formed in the back plate 104 of the junction box-driver assembly 100 are axially aligned with the mounting openings 448 of the mounting strut 190. Further, as illustrated in FIG. 3, fasteners 315 may be passed through the axially aligned mounting holes 548 and the mounting openings 448 of the housing 102 and the mounting strut 190, respectively, to removably couple the mounting strut 190 to the housing 102 of the junction box-driver assembly 100.

Furthermore, the mounting strut 190 may include coupling notches 457 that are substantially U-shaped and configured to receive fasteners therethrough to directly mount the junction box-driver assembly 100 to structural elements, such as joists, in the ceiling or to mount the junction box-driver assembly 100 to the mounting frame 1302 using fasteners. In other example embodiments, the coupling notches 457 may have any other appropriate shape without departing from a broader scope of the present disclosure. Additionally, in the example embodiment illustrated in FIG. 4, the mounting strut 190 may include a ridge 499 that is formed therein to provide structural strength to the mounting strut 190.

In one example, the junction box-driver assembly 100 of the present disclosure can be mounted directly to a mounting structure, such as joists, without the use of the mounting strut 190. For example, the housing 102 of the junction box-driver assembly 100 may be coupled to the mounting structure using fasteners that may be inserted through the mounting apertures 541 formed in the back plate 104 of the housing 102. In said example, the junction box-driver assembly 100 may or may not include the mounting strut 190. In other examples, the junction-box driver assembly 100 may be coupled to the mounting frame 1302 or any other appropriate mounting structure using the mounting strut 190. For example, the junction-box driver assembly 100 may be releasably locked to the mounting frame 1302 using the mounting strut 190 or coupled to a mounting structure using fasteners that may be passed through the coupling notches 457 of the mounting strut 190.

The mounting strut 190 allows the junction box-driver assembly 100 to be coupled to the mounting frame 1302 after the ceiling has been finished. For example, once the ceiling is finished, an opening that axially aligns with a light module receiving opening of the mounting frame 1302 may be formed therein. The mounting frame 1302 may be disposed above the ceiling and coupled to the mounting structure before the ceiling is finished. Once the opening has been formed in the ceiling, a user may insert the junction-box driver assembly 100 with the mounting strut 190 through the axially aligned openings of the ceiling and the mounting frame 1302; and the user may couple the mounting strut 190 to the complementary coupling features of the mounting frame 1302 to releasably lock the junction box-driver assembly 100 to the mounting frame 1302.

Even though the present disclosure describes the mounting strut 190 as being removably coupled to the junction box-driver assembly 100, one of skill in the art can understand and appreciate that in other example embodiments, the mounting strut 190 may be built-in or formed integrally with or integrated with the junction box-driver assembly 100 without departing from a broader scope of the present disclosure.

Although the present disclosure is described with reference to example embodiments, it should be appreciated by those skilled in the art that various modifications are well within the scope of the present disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. A junction box-driver assembly comprising:
    a housing that defines a cavity, the cavity configured to route electrical wiring to a luminaire therethrough and to house a driver module therein,
        wherein the cavity comprises a junction box cavity and a driver cavity, the driver cavity in fluid communication with the junction box cavity,
        wherein the junction box cavity is configured to route the electrical wiring to the luminaire,
        wherein the driver cavity is configured to house the driver module therein, and
        wherein the housing comprises:
            a back plate;
            a junction box cover that is removably coupled to the back plate and configured to cover the junction box cavity; and
            a driver cavity cover that is removably coupled to the back plate and configured to cover the driver cavity; and
    a mounting strut that is coupled to the housing and configured to attach the junction box-driver assembly to a mounting frame.

2. The junction box-driver assembly of claim 1, wherein the junction box cover is pivotally coupled to the back plate, and wherein the driver cavity cover is configured to be removably coupled to the back plate via a snap mechanism.

3. The junction box-driver assembly of claim 1, wherein the junction box cover comprises pivot flanges, and wherein pivot slots formed in the back plate are configured to receive the pivot flanges of the junction box cover to pivotally couple the junction box cover to the back plate.

4. The junction box-driver assembly of claim 1, wherein the junction box cover comprises a latch member that is configured to releasably latch the junction box cover to the back plate such that: (a) when the junction box cover is latched to the back plate using the latch member, the junction box cover closes the junction box cavity; and (b) when the latch member is released, the junction box cover opens to expose the junction box cavity.

5. The junction box-driver assembly of claim 1, wherein the back plate comprises locking tabs that protrude therefrom, and wherein the locking tabs are configured to engage with coupling slots that are formed in the driver cavity cover to removably couple the driver cavity cover to the back plate.

6. The junction box-driver assembly of claim 1, wherein the junction box cavity and the driver cavity are arranged such that the junction box cavity is stacked above the driver cavity.

7. The junction box-driver assembly of claim 1, wherein the junction box cavity and the driver cavity are arranged side-by-side.

8. The junction box-driver assembly of claim 1, wherein the mounting strut comprises mounting holes that are configured to receive fasteners therethrough to removably couple the mounting strut to the housing.

9. The junction box-driver assembly of claim 1, wherein the mounting strut comprises coupling notches that are configured to mate with complementary features of the mounting frame to releasably lock the junction box-driver assembly to the mounting frame.

10. The junction box-driver assembly of claim 1, wherein the mounting strut comprises coupling notches that are configured to receive fasteners therethrough to couple the junction box-driver assembly to a mounting structure.

11. The junction box-driver assembly of claim 1, wherein the back plate comprises mounting apertures that are configured to receive fasteners therethrough to couple the housing of the junction box-driver assembly to a mounting structure.

12. A junction box-driver assembly comprising:
    a housing configured to route electrical wiring to a luminaire and house a driver module therein, the housing comprising:
        a back plate that defines a cavity, wherein the cavity comprises a junction box cavity and a driver cavity that is disposed adjacent to and in fluid communication with the junction box cavity;
        a junction box cover coupled to the back plate and configured to cover the junction box cavity, the junction box cavity configured to route the electrical wiring to the luminaire; and
        a driver cavity cover that is removably coupled to the back plate and configured to cover the driver cavity that is configured to house the driver module therein.

13. The junction box-driver assembly of claim 12, further comprising:
    a mounting strut that is removably coupled to the housing and configured to attach the junction box-driver assembly to a mounting frame.

14. The junction box-driver assembly of claim 12, wherein the junction box cover comprises a latch member configured to releasably latch the junction box cover to the back plate.

15. The junction box-driver assembly of claim 12, wherein the driver cavity cover comprises:
   coupling slots that are configured to receive locking tabs of the back plate to removably couple the driver cavity cover to the back plate,
   a connector cable routing notch that is configured to route a connector cable of the driver module disposed in the driver cavity, and
   a switch opening that is configured to receive a switch interface of a driver module therethrough, and
   wherein the switch interface is configured to allow one or more controllable features of a light module of the luminaire to be field selectable, the light module being coupled to the junction box-driver assembly via the connector cable of the driver module housed in the junction box-driver assembly.

16. The junction box-driver assembly of claim 12, wherein the housing may be configured such that the junction box cavity is stacked above the driver cavity.

17. A junction box-driver assembly comprising:
   a back plate configured to route electrical wiring to a luminaire and house an electrical power supply device associated with the luminaire therein, the back plate comprising:
      a base wall; and
      a side wall that extends along at least a portion of a perimeter of the base wall such that one end of the back plate is open, the side wall being substantially perpendicular to the base wall,
      wherein the base wall and the side wall are arranged such that they define a junction box cavity and a driver cavity, the driver cavity in fluid communication with the junction box cavity;
   a junction box cover configured to cover the junction box cavity, the junction box cavity configured to route the electrical wiring to the luminaire;
   a driver cavity cover coupled to the back plate and configured to cover the driver cavity;
   the electrical power supply device disposed in the driver cavity and comprising a switch interface that extends through a switch opening in the driver cavity cover, the switch interface configured to allow one or more controllable features of a light module of the luminaire to be field selectable when the light module is coupled to the junction box-driver assembly; and
   a mounting strut coupled to the back plate and configured to attach the junction box-driver assembly to a mounting frame.

18. The junction box-driver assembly of claim 17, wherein the side wall further comprises knockouts with pry-out slots.

19. The junction box-driver assembly of claim 17, wherein the base wall comprises mounting apertures that are configured to receive fasteners therethrough to couple the housing of the junction box-driver assembly to a mounting structure.

20. The junction box-driver assembly of claim 17, wherein the electrical power supply device is a light emitting diode driver.

\* \* \* \* \*